(12) United States Patent
Miceli

(10) Patent No.: US 8,254,755 B2
(45) Date of Patent: Aug. 28, 2012

(54) METHOD AND APPARATUS FOR DISPLAYING 3D MULTI-VIEWPOINT CAMERA VIDEO OVER A NETWORK

(75) Inventor: Sean Miceli, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 539 days.

(21) Appl. No.: 12/549,092

(22) Filed: Aug. 27, 2009

(65) Prior Publication Data

US 2011/0050846 A1 Mar. 3, 2011

(51) Int. Cl.
*H04N 9/80* (2006.01)

(52) U.S. Cl. .......... 386/248; 386/343; 348/21; 709/231; 709/232; 725/118; 725/148

(58) Field of Classification Search .................. 725/118, 725/148; 709/231, 232; 348/21; 386/248, 386/343
See application file for complete search history.

(56) References Cited

U.S. PATENT DOCUMENTS

| | | | |
|---|---|---|---|
| 5,703,961 A | 12/1997 | Rogina et al. | |
| 6,124,862 A | 9/2000 | Boyken et al. | |
| 6,353,461 B1 | 3/2002 | Shore et al. | |
| 6,757,432 B2 | 6/2004 | Hijiri et al. | |
| 7,466,899 B2 * | 12/2008 | Kishi | 386/343 |
| 7,543,073 B2 * | 6/2009 | Chou et al. | 709/231 |
| 2003/0172131 A1 | 9/2003 | Ao | |
| 2003/0190144 A1 * | 10/2003 | Kuno et al. | 386/68 |

* cited by examiner

*Primary Examiner* — Michael Won
(74) *Attorney, Agent, or Firm* — Mark P. Watson

(57) ABSTRACT

A number of cameras capture a scene and send corresponding video sub-streams to an acquisition PC. Each sub-stream is made up of a plurality of sub-frames. The acquisition PC sends the sub-streams over a network to a playback PC. The playback PC stores each sub-frame in a queue corresponding to an associated sub-stream. For each sub-stream the playback PC calculates a sub-stream average period to produce a plurality of sub-stream average periods. It then calculates a composite average period by averaging the plurality of sub-stream average periods, and calculates a playback frame rate as a reciprocal of the composite average period. The playback PC then reads the sub-frames from their corresponding queue in synchronism with the calculated playback frame rate to display the plurality of sub-streams.

20 Claims, 3 Drawing Sheets

METHOD AND APPARATUS FOR DISPLAYING 3D MULTI-VIEWPOINT CAMERA VIDEO OVER A NETWORK

BACKGROUND

We have developed a multi-viewpoint 3D camera system. The playback system is on a different PC than the acquisition system. To be able to process video in real time, we need to transfer the video from the 3D camera system to the processing/playback PC. This is important not only for playing back of the video stream, but for calibration and alignment of the cameras as well. Our previous approach was time consuming. Frames were captured from the 3D camera system, converted into a movie format, and transferred to the playback PC. We repeated this until all the cameras were in alignment to produce a multi-viewpoint 3D movie.

In film, the term 3-D (or 3D) is used to describe any visual presentation system that attempts to maintain or recreate moving images of the third dimension, the illusion of depth as seen by the viewer. The 3D technique usually involves filming two images simultaneously, with two cameras positioned side by side, generally facing each other and filming at a 90 degree angle via mirrors, in perfect synchronization with each other and each camera having identical technical characteristics. When viewed in such a way that each eye sees its photographed counterpart, the viewer's visual cortex will interpret the pair of images as a single three-dimensional image. The advance of 3D cameras makes it possible to capture multiple viewpoints at once and without the use of mirrors. A 3D camera looks like a normal digital camera but generally has two lenses and two sensors that take an image of the foreground and the background of any scene. A processor within the camera blends the two images. However, to properly obtain multiple viewpoints alignment of the multiple cameras is still critical and the cameras must be synchronized. The present invention can utilize 3D cameras or single lens cameras and a special projection screen.

If the cameras are out of alignment the eyes cannot fuse the images together into a 3D scene. Being able to stream the video from the 3D camera system to the playback system would greatly speed up the process of properly aligning the cameras. Camera positions could be changed for calibration and the results could be quickly seen on the playback system.

DESCRIPTION OF RELATED ART

There are known techniques for handling real time streaming video across a network. However, there are some differences in handling multi-viewpoint video streams that we can take advantage of to optimize the playback experience. Also, in our case we need to be careful to keep the video streams synchronized, which problem is generally not addressed in the prior art.

SUMMARY OF INVENTION

The 3D system is composed of N cameras two for each 3D viewpoint resulting in N-1 viewpoints for the 3D scene. The scene, represented by the contents of the video, is the total view captured by the cameras. Each camera of the system produces a sequence of frames that form a video stream. The video stream composed of all the sequences of frames of all the cameras will be called the composite stream. One video stream from a particular camera will be called a sub-stream. A frame from the composite stream will be called a composite frame. A frame from a sub-stream will be called a sub-frame.

To accomplish the playback, the sub-streams captured from each of the cameras are sent across the network. There is one network stream for each camera sub-stream. When the 3D camera system records a composite frame, each camera of the system is synchronized together at the hardware level. Thus each sub-frame that represents a different viewpoint of the scene will be taken at the same time. On playback these sub-frames need to be played at the same time. If the precise synchronization of the sub-frames is not maintained then it becomes difficult for the eye to fuse the 3D scene together from the separate sub-streams.

Thus an object of the present invention is to minimize latency and to keep the synchronization of the sub-frames correct while playing the composite video stream at the appropriate frame rate. The minimization of latency is important for the calibration process. If the latency is too long then the adjustments needed to calibrate the cameras becomes more difficult, and of course, the movie needs to be played at the correct frame rate for the video to appear realistic.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

As mentioned in the summary, the 3D system is composed of N cameras two for each 3D viewpoint resulting in N-1 viewpoints for the 3D scene. The scene, represented by the contents of the video, is the total view captured by the cameras. Each camera of the system produces a sequence of frames that form a video stream. The video stream composed of all the sequences of frames of all the cameras will be called the composite stream. One video stream from a particular camera will be called a sub-stream. A frame from the composite stream will be called a composite frame. A frame from a sub-stream will be called a sub-frame.

Frame or sub-frame is used herein to indicate a frame of data. The general organization of the data is not critical to the present invention and will depend, as usual, on the resolution of the capture (e.g. cameras) and display (e.g. projectors) devices, color depth, palette size, etc.

In the playback system there are some assumptions made about acquisition of the video data in the 3D camera system. The assumptions are that each composite frame of the video is taken at a fixed rate, such as 30 frames per second (fps), that each sub-frame is recorded at the same time as the other sub-frames (i.e. camera acquisition is synchronized), and that the sub-frames are sent from the cameras at approximately the same time across the network. It would also be preferable if the sub-frames were sent in the same order, but it is not necessary.

Figure 1:
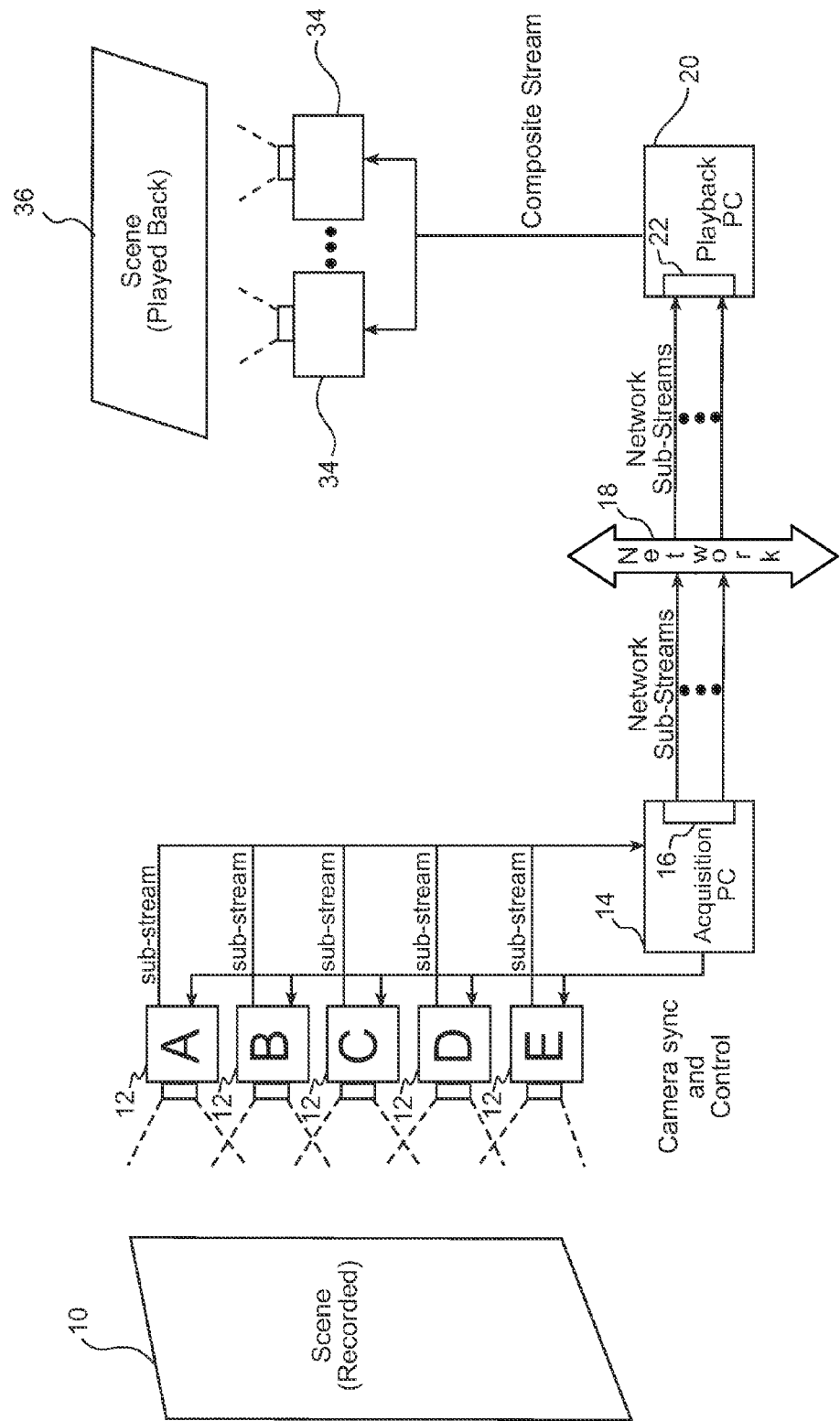
FIG. 1 is a general block diagram of the system of the present invention.

Referring to FIG. 1, scene 10 is depicted as a block but of course it would encompass both still and moving objects. Scene 10 is captured by a plurality of cameras 12. Five cameras (labeled A-E) are depicted as an example, yielding four different 3D viewpoints. Video acquisition PC 14 controls each camera 12 to, for example, begin recording and stop recording. The operations of the cameras 12 are synchronized so that upon playback the human eye can resolve the separate 3D images into a singe 3D scene.

Video acquisition PC 14 can be a standard PC but could also be a specially designed processing unit 18 that will include various components, as is well known in the art. These will include, for example, a central processing unit (CPU) and a main memory, which could include a hard drive, RAM, ROM, CD, etc. Main memory as used herein is all memory that can store, for example, the operating system, application programs, display software, etc. For simplicity, standard components and busses are omitted from the drawings depicting video acquisition PC 14.

The sub-streams of sub-frames from each camera 12 are received by video acquisition PC 14 and then sent through network interface 16 across network 18 to network interface 22 of playback PC 20. Transmission between video acquisition PC 14 and playback PC 20 can be implemented using any standard transmission protocol such as the Transmission Control Protocol (TCP), which is one of the core protocols of the Internet Protocol Suite. TCP is one of the two original components of the suite (the other being Internet Protocol, or IP), so the entire suite is commonly referred to as TCP/IP. Whereas IP handles lower-level transmissions from computer to computer as a message makes its way across the Internet, TCP operates at a higher level, concerned only with the two end systems, for example a Web browser and a Web server. In particular, TCP provides reliable, ordered delivery of a stream of bytes from a program on one computer to another program on another computer. TCP controls message size, the rate at which messages are exchanged, and network traffic congestion.

Playback PC 20 forms a composite video stream which is delivered to display devices, which include, for example, a plurality of projectors 34, only two of which are shown in FIG. 1. The projectors 34 playback scene 36, which ideally will appear to a viewer as a 3D representation of the scene 10 recorded by cameras 12.

First we discuss how we determine a frame rate for the playback PC 20. The system is designed to play at a consistent frame rate. There will most likely be a difference in the hardware clocks of acquisition PC 14 and playback PC 20. Therefore we must calculate a frame rate that will be used as the playback frame rate. The calculated frame rate will be different than the frame rate of acquisition PC 14.

Figure 2:
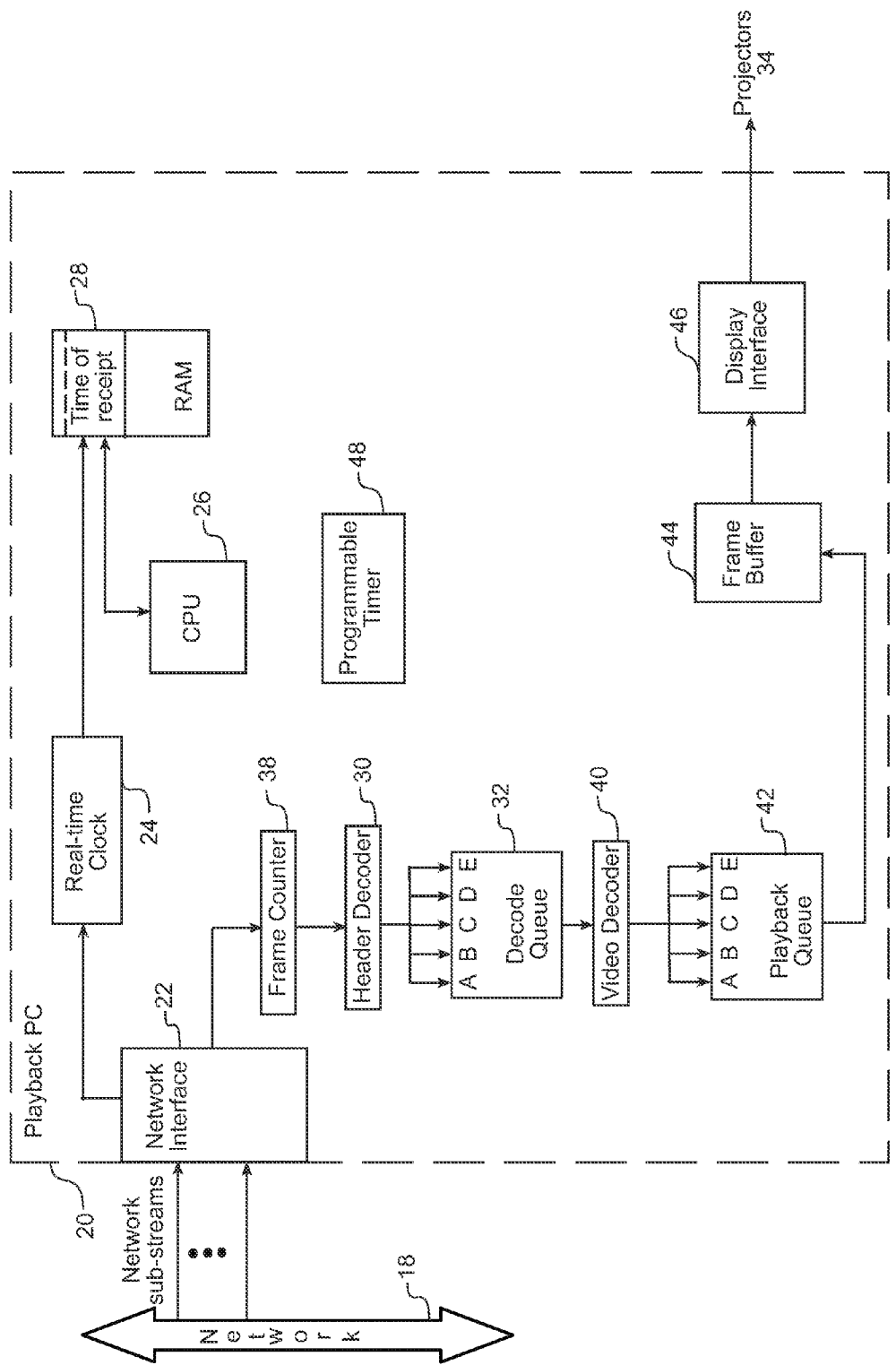
FIG. 2 is a block diagram showing some major components of the playback PC.

The playback PC 20 frame rate is calculated from the arrival times of the sub-frames received from cameras 12. As shown in FIG. 2, playback PC 20 will include, for example, a network interface 22, a real time clock 24, a central processing unit (CPU) 26, and a random access memory (RAM) 28. As each sub-frame is received in network interface 22, the real time clock 24 is triggered to register the time of receipt and send it to the RAM 28, where it is stored. RAM 28 is configured with multiple time receipt areas, one for each of the sub-streams received from cameras 12 (A-F). For clarity, most internal busses and signal lines are omitted from the drawings.

The playback PC 20 frame rate is initially calculated from the first few frames sent from each camera. The arrival time of the sub-frames should be the same as the sending time plus some added network constant for network transport, ta=ts+k. As long as k is close to a constant the arrival rate will be close to that of the sending rate. This works out in practice with some minor errors that require accommodation. Since the frame rate, or the period between two sub-frames is of interest, rather than the constant k, subtracting a time of arrival of previous sub-frame from the time of arrival of current frame will in effect drop out k from the above equation, assuming k is a constant. Because of network conditions and routing, k is not a constant in practice, but, if the period is averaged over a sequence of frames, in most cases k becomes negligible. Also, since there are separate camera sub-streams for the video a better estimate can be calculated than if this were a single stream.

Figure 3:
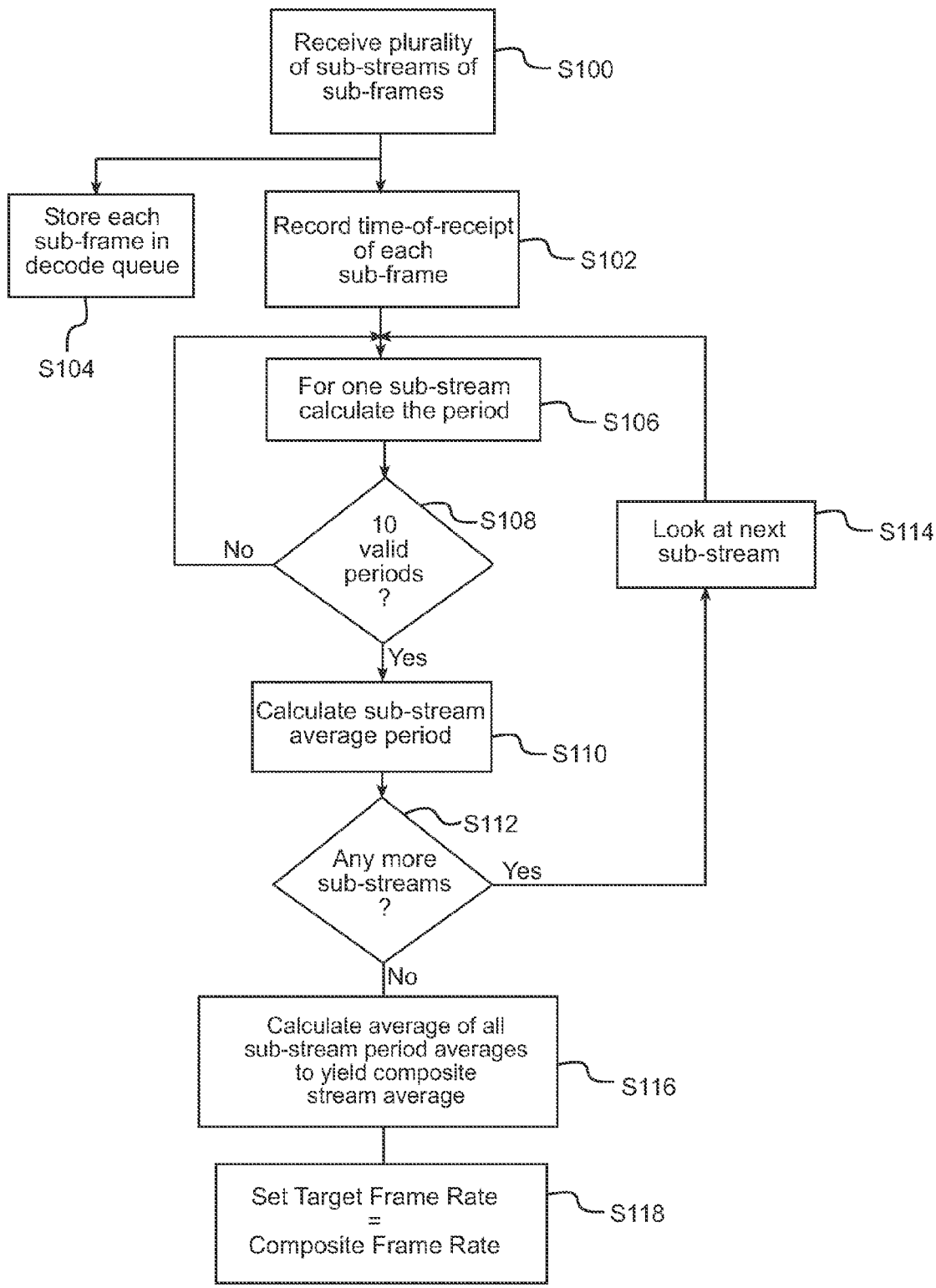
FIG. 3 is a flowchart showing the Target Frame Rate calculation of the present invention.

So, referring to FIG. 3, a plurality sub-streams (A-K) of sub-frames are received through network interface 22 (step S100), and for each sub-frame the time of receipt is registered by real time clock 24 and stored in RAM 28 (step S102). Also, the header of each sub-frame is decoded by header decoder 30, and each sub-frame is stored in decode queue 32, which will be described hereinafter. For one sub-stream, the time of receipt of the previous sub-frame is subtracted by CPU 26 from the time of receipt of the current sub-frame, CurSubframeTime−PrevSub-frameTime=period (step S106). At step S108, we loop until we have ten, for example, valid periods. What constitutes a valid period will be discussed later.

For sub-stream A, the period between ten, for example, sub-frames are averaged by CPU 26 to give Period-$A_{AVE}$ (step S110). At step S112, we loop until there are no additional sub-streams to look at. If there are additional sub-streams, i.e. B, C, D, E, we look at the next sub-stream and perform steps S106 to S110 for sub-streams B-E to yield Period-$B_{AVE}$, Period-$C_{AVE}$, Period-$D_{AVE}$, and Period-$E_{AVE}$, respectively (step 106). Then each of these sub-stream period averages are averaged together by CPU 26 to get a composite stream average CompositePeriod$_{AVE}$ (step 116).

To arrive at a composite frame rate or frequency, we take the reciprocal of the composite period average: Composite Frame Rate=1/CompositePeriod$_{AVE}$. We will use this calculated Composite Frame Rate as the Target Frame Rate for our playback PC 20 (step S118).

We calculated the frame rate using real time clock 24, RAM 28, and CPU 26 as an example, but any method would be equally suitable such as using a programmable counter or interval timer instead of a real time clock, and using dedicated registers or register sets instead of memory space in a RAM.

When calculating the frame rate there are network conditions that could yield undesirable results. The network route through which the sub-frames are transmitted will change. This could cause the constant k to change significantly. Also a period of network congestion may slow the transfer rate for a frame or two. This would cause the sub-frame period to increase a significant amount and probably cause the next frame or two to be received right after the previous frame with the resulting sub-frame period being near zero.

To account for this, we ignore small sub-frame periods that are near zero. They do not add much information, except to perhaps confirm that the previous frame was delayed. Also, in calculating the average frame rate as outlined above, we ignore sub-frame periods that are well outside the norm. In calculating the sub-frame frame rate, sub-frames that have a period of greater than twice the standard deviation will be ignored. The median absolute deviation (MAD) will be used as an estimate for the standard deviation. For example, consider the data (1, 1, 2, 2, 4, 6, 9). This data group has a median value of 2. The absolute deviations about 2 are (1, 1, 0, 0, 2, 4, 7) which in turn have a median value of 1. So, the MAD for this data is 1. The MAD is more robust when network conditions get near network capacity and the data collected will not quite be normal. The startup condition will be to not do anything (i.e. loop) until the above conditions are met and the 10 valid period samples have been collected (step S108).

We continue to monitor (calculate) the average frame as sub-frames arrive and reset the Target Frame Rate to the calculated Composite Frame Rate. The Target Frame Rate will be used by the playback PC 20 to determine when to play the next frame.

As each sub-frame is received in playback PC 20 it is input through frame counter 38 and header decoder 30 before being placed in decode queue 32. The frame counter 38 and header decoder 30, which will be discussed later, are not necessary for every environment but are useful if a less reliable transport protocol is used. The decode queue 32 is divided into separate receive queues for each sub-stream A-E.

Each sub-frame from the decode queue 32 is decoded by video decoder 40. Video decoder 40 decodes the data received from camera 12, which may be, for example, in a compressed format. Video decoder 40 will place the data in a format that is suitable for display by the display devices, such as projectors 34. After the sub-frame is decoded it is placed in playback queue 42 for the appropriate sub-stream. There is a playback queue (A-E) for each sub-stream.

When the playback PC 20 issues a timing signal (e.g. a frame synchronization signal) to display the next composite frame each sub-frame is read from its corresponding playback queue and displayed at the same time to maintain synchronization. The sub-frames may be stored in a memory, such as frame buffer 44, prior to being output through a display interface 46 to the display systems, such as projectors 34.

The Target Frame Rate can be input to a programmable timer 48, for example, that initiates timing signals to read sub-frames from the playback queue 42 and supply appropriate timing signals to frame buffer 44. Programmable timer 48 will output, for example, a frame synchronization signal that will be utilized to receive, store and output for display the data that makes up a frame.

The Target Frame Rate cannot be used directly to initialize the programmable timer 48 for the next frame, as some sub-frames may arrive after that average time. So, we program in a small delay small period. The estimate of the standard deviation that we calculated previously for the sub-frame periods will be used to determine the wait period. The worst MAD of the sub-streams will be used. The delay period will be set to two times the MAD. Most sub-frames will arrive within this delay period.

As discussed above, each sub-frame that is received by playback PC 20 is placed in decode queue 32 to be decoded by video decoder 40. The frame is then placed into a playback queue 42 for playback. This step happens any time a frame is received. For now we will not worry about sub-frames arriving out of order (as is the case for a TCP transport stream). Decode queue 32 and playback queue 42 are each similarly divided into a plurality of queues A-E, for example, one for each of the camera sub-streams.

As previously mentioned, the composite frame is comprised of the group of sub-frames A-F. Upon playback if there is not a sub-frame to be displayed in the playback queue, that composite frame will not be displayed, i.e. frame buffer 44 will be refreshed with its current contents rather than loading in a new composite frame. This is to help maintain the eye's ability to resolve various viewpoints as a single 3D scene. That incomplete composite frame will be skipped. Frame counter 38 is used to determine if a composite frame needs to be skipped. Each sub-frame, as it is input through network interface 22, will be numbered with a composite frame number from frame counter 38. If the sub-frame at the exit location of the playback queue 42 does not match the current frame number, that particular sub-frame will not be loaded into the frame buffer 44 and thus will not be played. If a composite frame has been skipped any sub-frame having that composite frame number is skipped, i.e. deleted from the playback queue 42 without being loaded into frame buffer 44, i.e. a frame refresh will occur without loading frame buffer 44 with new contents. Each time the programmable timer 48 outputs the frame synchronization signal, the composite frame counter 38 will be increased.

The above will work in the ideal TCP transport, but if a non-reliable transport is used, say User Datagram Protocol (UDP), then there could be dropped frames, out of order frames, or frames arriving after they have been played. It is even possible to get apparent duplicate frames. To handle these situations acquisition PC 14 will place a header before each sub-frame with its composite frame number included. This can then be used to by header decoder 30 to order the sub-frames before they are placed on the decode queue 32. As mentioned previously, the decode queue 32 is divided into separate receive queues for each sub-stream A-E. Each receive queue is a priority queue organized according to composite frame number. This ability to handle a less reliable transport protocol adds more latency into the system.

It is possible for the playback queue to continually grow. There should only be one or two items in each playback queue A-E. If the playback queue is getting large it indicates that the estimate of the sending frame rate is incorrect. Similarly if many frames are skipped because there is nothing in the play queue then the estimate is also incorrect. In these cases an error term will be added to the estimation of the target frame rate. The error term added (or subtracted) will be at the rate at which the queue is growing or the difference in the amount of time between when a sub-frame is to be played and when it is received.

The sub-frames are each displayed on projectors 34, with each projector displaying one sub-stream. The projectors are calibrated and aligned to display on a special screen having multiple layers. A first layer of the screen has a small diffusion angle in one direction and large diffusion angle in the other direction. The second layer is a retro-reflective material that reflects a light ray back in the incident direction. The screen is described in commonly assigned application Ser. No. 12/418, 137, filed Apr. 3, 2009. The screen, in effect, directs a different view to each of the viewer's eyes yielding a 3D view, and moving the head slightly will produce a different view of the 3D scene 36.

The present invention may be embodied on a computer-readable medium having instructions that, when executed by a computer or processing unit(s), perform the method(s) of the present invention. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for playing back a recorded video comprising:
receiving from a network a plurality of recorded video sub-streams, each sub-stream including a plurality of sub-frames;
for each sub-stream calculating a sub-stream average period to produce a plurality of sub-stream average periods;
calculating a composite average period by averaging the plurality of sub-stream average periods;
calculating a playback frame rate as a reciprocal of the composite average period;
storing each sub-frame in a queue corresponding to an associated sub-stream;
reading the sub-frames from their corresponding queue in synchronism with the calculated playback frame rate to display the plurality of sub-streams.

2. The method of claim 1 including recording a time of receipt of each sub-frame.

3. The method of claim 2 wherein each sub-stream average period is calculated using a time of receipt of a plurality of sub-frames.

4. The method of claim 1 wherein calculation of each sub-stream average period ignores periods of greater than twice the median absolute deviation.

5. The method of claim 1 wherein each video sub-stream is recorded by a corresponding camera.

6. The method of claim 1 wherein each sub-frame includes a header having a composite frame number.

7. The method of claim 6 including ordering each sub-frame according to its composite frame number before storing each sub-frame in its corresponding queue.

8. The method of claim 7 wherein displaying the plurality of sub-frames skips sub-frames whose composite frame number does not correspond with a current frame number of a frame for display.

9. A computer readable medium comprising one or more sequences of instructions which, when executed by one or more processing units, causes the one or more processing units to perform the method of claim 1.

10. A computer readable medium comprising one or more sequences of instructions which, when executed by one or more processing units, causes the one or more processing units to perform the method of claim 2.

11. A computer readable medium comprising one or more sequences of instructions which, when executed by one or more processing units, causes the one or more processing units to perform the method of claim 7.

12. A system for playing back 3D recoded video, comprising:
a plurality of cameras that capture a scene and produce a corresponding plurality of video sub-streams, each sub-stream including a plurality of sub-frames;
a network;
an acquisition PC that receives the sub-streams and sends the sub-streams over the network;
a playback PC that receives the sub-streams from the network, and the playback PC
for each sub-stream calculates a sub-stream average period to produce a plurality of sub-stream average periods;
calculates a composite average period by averaging the plurality of sub-stream average periods;
calculates a playback frame rate as a reciprocal of the composite average period;
stores each sub-frame in a queue corresponding to an associated sub-stream;
reads the sub-frames from their corresponding queue in synchronism with the calculated playback frame rate to display the plurality of sub-streams.

13. The system of claim 12 wherein the playback PC records a time of receipt of each sub-frame.

14. The system of claim 13 wherein the playback PC calculates each sub-stream average period using a time of receipt of a plurality of sub-frames.

15. The system of claim 12 wherein the acquisition PC adds to each sub-frame a header having a composite frame number.

16. The system of claim 15 wherein the playback PC orders each sub-frame according to its composite frame number before storing each sub-frame in its corresponding queue.

17. A device for playing back a recorded video, comprising:
an interface that receives from a network a plurality of recorded video sub-streams, each sub-stream including a plurality of sub-frames;
a plurality of queues corresponding to the plurality of sub-streams, each queue storing the sub-frames of a corresponding sub-stream: and
a processing unit that
for each sub-stream calculates a sub-stream average period to produce a plurality of sub-stream average periods;
calculates a composite average period by averaging the plurality of sub-stream average periods;
calculates a playback frame rate as a reciprocal of the composite average period; and
reads the sub-frames from their corresponding queue in synchronism with the calculated playback frame rate to display the plurality of sub-streams.

18. The device of claim 17 including a memory and wherein the processing unit records a time of receipt of each sub-frame in the memory.

19. The device of claim 18 wherein the processing unit calculates each sub-stream average period using a time of receipt of a plurality of sub-frames.

20. The device of claim 17 wherein the processing unit calculates each sub-stream average period by ignoring periods of greater than the twice the median absolute deviation.

* * * * *